Sept. 26, 1967
W. T. DENNISON
3,343,854
SHAFT LOCK FOR COMPRESSOR OR TURBINE LOCK
Filed April 7, 1965
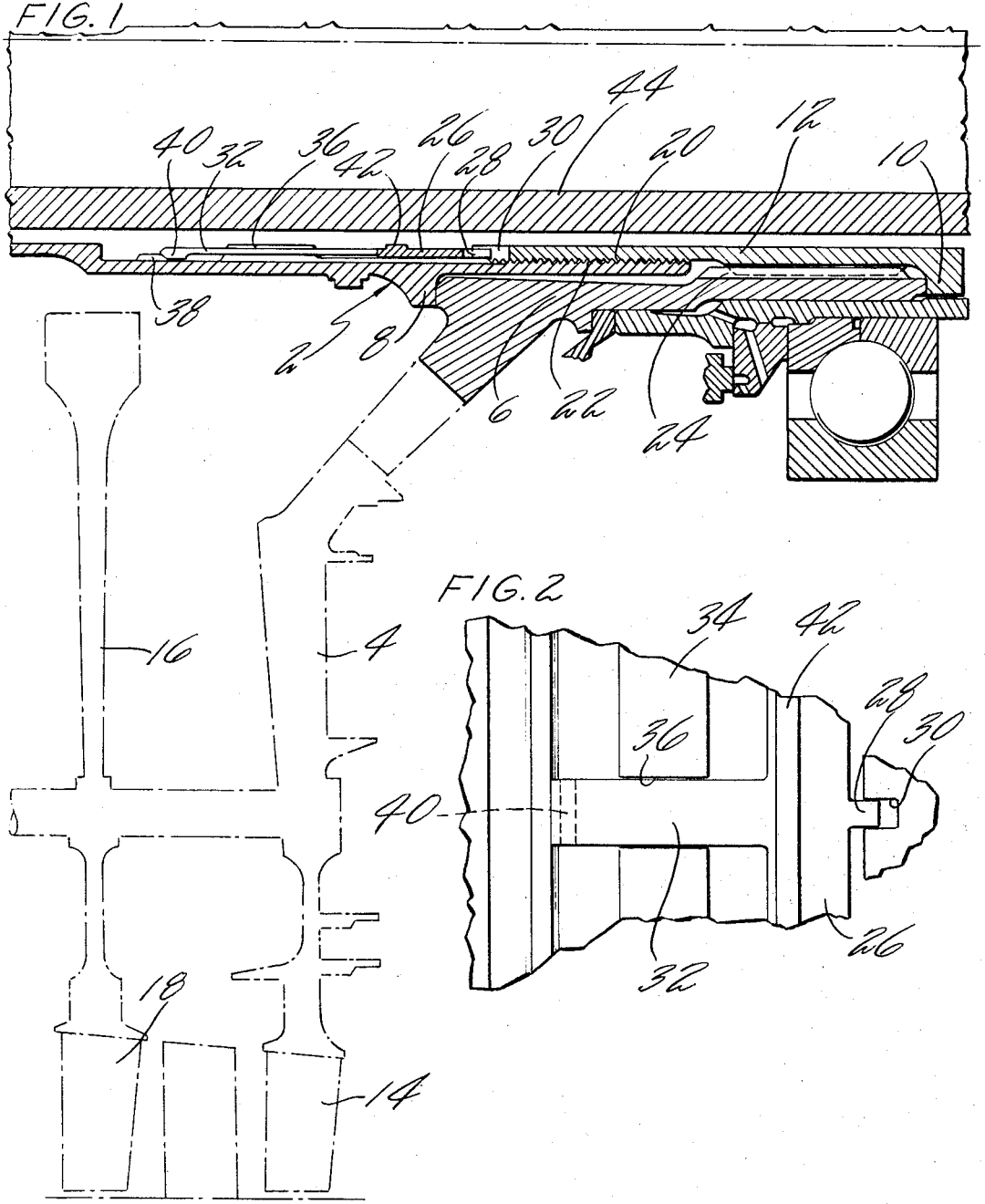
INVENTOR
WILLIAM T. DENNISON
BY Charles A. Warren
ATTORNEY

United States Patent Office 3,343,854
Patented Sept. 26, 1967

3,343,854
SHAFT LOCK FOR COMPRESSOR OR
TURBINE LOCK
William T. Dennison, West Hartford, Conn., assignor to United Aircraft Corporation, East Hartford, Conn., a corporation of Delaware
Filed Apr. 7, 1965, Ser. No. 446,206
4 Claims. (Cl. 287—53)

ABSTRACT OF THE DISCLOSURE

A locking means and mounting arrangement to hold a hub in position on a hollow shaft, the locking means being engageable for movement into and out of locking position by access through the hollow shaft.

This invention relates to a locking device and particularly to a device for holding a threaded member in position on a shaft.

In many installations a nut or member is threaded to a shaft for holding a ring or hub in position thereon and a locking means is necessary to hold the nut in position without unbalancing the assembly. One feature of the invention is a locking device to accomplish this purpose. Another feature is a locking means located within the shaft or nut and engageable for movement into and out of locking position by access through the hollow shaft.

In gas turbine engines in the type shown, for example, in the Savin Patent No. 2,747,367, it is frequently necessary to mount the blade hubs or the hubs of the rotors in fixed axial position on a hollow shaft with the clamping and locking means for the hub accessible from within the shaft. One feature of the invention is a mounting arrangement to hold the hub in position on the hollow shaft by threaded clamping means which in turn are locked in clamping position or unlocked by access through the threaded clamping means or the hollow shaft.

Other features and advantages will be apparent from the specification and claims, and from the accompanying drawing which illustrates an embodiment of the invention.

FIG. 1 is a fragmentary sectional view through a device embodying the invention.

FIG. 2 is a fragmentary developed view of the locking means.

In the arrangement shown, a hollow shaft 2 has mounted thereon a disc 4, the hub 6 of which is clamped between a shoulder 8 on the shaft and a cooperating shoulder 10 on a hollow clamping member nut 12. In the arrangement shown, the disc 4 carries a row of blades 14 on its periphery and supports in spaced relation thereto another disc 16 carrying a row of blades 18 on its periphery.

The nut 12, which is in the form of a sleeve, has threads 20 cooperating with internal threads 22 adjacent the end of the hollow shaft 2 so that as the nut is turned within the hollow shaft the hub 6 is clamped between the cooperating shoulders 8 and 10. If desired, the hub 6 and nut 12 may have cooperating axial splines 24 to prevent relative rotation after the device is assembled.

To hold the nut or clamping sleeve 12 in locked position, the shaft 2 has mounted therein internally thereof a sleeve 26 having at one end a series of projections 28 in a position to engage in notches 30 in the end of the nut 12. On the opposite end of the sleeve 26 are a plurality of spring fingers 32 located in spaced slots 34 in an inwardly projecting rib 36 on the shaft. At the end of the spring fingers 32 is another inwardly projecting rib 38 on the shaft in a position to be engaged by outwardly extending projections 40 on the ends of the fingers. The sleeve 26 also carries an inwardly projecting rib 42 for the purpose of moving the sleeve from locking to unlocked position.

The locking ring is shown in the locked position with the projections 28 engaging in the notches 30. At this time the rib 38 is located at the left of the projections 40 and the locking ring is held in the axial position shown by engagement between the projections 40 and the right-hand end of the projecting rib 38. To move the locking ring into unlocked position, a suitable tool is inserted within the hollow nut 12 into engagement with the rib 42 on the sleeve 26. The sleeve may then be pushed to the left with the spring fingers permitting the projections 40 to ride over the rib 38 and into engagement with the opposite end of the rib at which time the projections 28 are removed from the notch 30 and the nut can be unscrewed from within the hollow shaft. Suitable splines may be provided at the end of the nut for the purpose of turning it.

Similarly, if the locking sleeve 26 is in unlocked position insertion of a tool within the hollow shaft into engagement with the rib 42 will permit the locking sleeve to be moved to the right in the figure to return it to the operative locking position shown.

The device above described has particular utility in a gas turbine powerplant in which there are two concentric rotors as in the Savin patent above mentioned. In the arrangement described, the shaft 2 is the outer of the two concentric shafts carrying the concentric rotors and the locking means are such that the inner shaft 44 may be positioned within and out of contact with the shaft 2 and the relative rotation of the two shafts will not be interfered with in any way by the locking means above described. It will be further noted that the locking device, above described, will be in balance about the axis of the shaft provided that the several spring fingers 32 are uniformly spaced about the ring and also provided that the projections 28 are also uniformly spaced about the ring.

It is to be understood that the invention is not limited to the specific embodiment herein illustrated and described, but may be used in other ways without departure from its spirit as defined by the following claims.

I claim:

1. The combination, with a shaft having a shoulder, a hub splined to the shaft and engaging said shoulder and a clamping ring threaded on said shaft and clamping the hub against the shoulder, of locking means to hold the ring against turning on the shaft including a sleeve axially slidable relative to said ring and having splines at one end, said ring having cooperating splines thereon for engagement by the splines on the sleeve, said sleeve having resilient projections thereon and said shaft having axial grooves to receive the projections to prevent relative rotation, and detents on the ends of the projections engaging alternately in spaced notches in the shaft thereby to hold the sleeve releasably in either of two axially spaced positions.

2. The combination with a shaft having axial stop means thereon, a hub surrounding the shaft and limited in axial movement in one direction on the shaft by said stop means, a clamping ring having a shoulder engageable with said hub to limit its axial movement in the other direction on said shaft, said ring having threads at one end engaging with cooperating threads on the shaft, a sleeve axially slidable within and guided by said shaft and having locking lugs at one end engageable with cooperating notches in the ring, said shaft having axial slots therein and said sleeve having axially projecting fingers in said slots to prevent relative turning of the sleeve within the shaft but allowing axial sliding movement of the sleeve guided by said slots, said shaft having axially spaced annular grooves in its inner surface and said sleeve having resiliently mounted protrusions in a position to engage selectively in either of the annular grooves in two axially spaced positions of the sleeve, in one of which positions the lugs in the sleeve are in engagement with the notches in the ring, and in the other of which the lugs are removed from the notches and the ring may be turned with respect to the shaft.

3. The combination as in claim 2 in which the protrusions are on the ends of the axially projecting fingers.

4. In a rotor lock, a shaft having a shoulder and a threaded portion thereon axially spaced from the shoulder, a rotor having a hub engaging at one end against the shoulder, a threaded nut on the shaft engaging the threaded portion of the shaft and in axial engagement with the hub, said hub also being splined to said nut, and means for locking the nut to the shaft including a sleeve guided by the shaft and axially slideable relative to the shaft, said sleeve having detents at one end, and said shaft having cooperating notches engageable by the detents in one axial position of the sleeve, cooperating means on the shaft and sleeve to lock the sleeve against rotation relative to the shaft, and means for retaining said sleeve resiliently in said one axial position, said retaining means including projections on said sleeve and axially spaced grooves in said shaft engageable by said projections in either of two axial positions of the sleeve in the nut.

References Cited
UNITED STATES PATENTS

| | | | |
|---|---|---|---|
| 838,462 | 12/1906 | Sartain | 151—8 |
| 855,512 | 6/1907 | Hutson et al. | 151—8 |
| 2,027,439 | 1/1936 | King | 170—173 X |
| 2,041,507 | 5/1936 | Zeder. | |
| 2,369,297 | 2/1945 | Johnson. | |
| 2,747,367 | 5/1956 | Savin | 60—39.16 |
| 2,804,323 | 8/1957 | Morley | 287—53 |

FOREIGN PATENTS

| | | |
|---|---|---|
| 77,629 | 6/1933 | Sweden. |

CARL W. TOMLIN, *Primary Examiner.*

A. V. KUNDRAT, *Assistant Examiner.*